(12) United States Patent
Lange et al.

(10) Patent No.: US 8,419,030 B2
(45) Date of Patent: Apr. 16, 2013

(54) REAR WHEEL SUSPENSION SYSTEM FOR MOTOR VEHICLES

(75) Inventors: Olav Lange, Bottrop (DE); Michel Vencken, Bree (BE)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 13/170,978

(22) Filed: Jun. 28, 2011

(65) Prior Publication Data

US 2012/0007328 A1 Jan. 12, 2012

(30) Foreign Application Priority Data

Jul. 8, 2010 (DE) .......................... 10 2010 017 812

(51) Int. Cl.
*B60G 3/12* (2006.01)
*B60G 9/02* (2006.01)
*B60G 11/20* (2006.01)
*B60G 21/05* (2006.01)

(52) U.S. Cl.
USPC ............. 280/124.116; 267/273; 280/124.106; 280/124.128; 280/124.13

(58) Field of Classification Search .................. 267/273, 267/276, 279; 280/124.106, 124.11, 124.116, 280/124.125, 124.128, 124.13, 124.131, 280/124.133, 124.153, 124.166, 124.167, 280/124.169
See application file for complete search history.

(56) References Cited

U.S. PATENT DOCUMENTS

| | | | | |
|---|---|---|---|---|
| 2,330,633 A | * | 9/1943 | Seyerle .......................... | 180/359 |
| 3,400,945 A | * | 9/1968 | Sampietro .............. | 280/124.128 |
| 3,879,051 A | * | 4/1975 | Kolbe ....................... | 280/86.751 |
| 4,157,840 A | * | 6/1979 | Kroniger et al. ........ | 280/124.134 |
| 4,530,514 A | * | 7/1985 | Ito .............. | 280/124.13 |
| 4,589,677 A | * | 5/1986 | Matschinsky .......... | 280/124.156 |
| 4,834,416 A | * | 5/1989 | Shimoe et al. ........... | 280/124.13 |
| 4,941,677 A | * | 7/1990 | Matsumoto et al. ... | 280/124.138 |
| 7,044,565 B2 | * | 5/2006 | Kang ............................. | 301/127 |
| 2005/0082904 A1 | | 4/2005 | Kang | |
| 2009/0033141 A1 | * | 2/2009 | Bitz et al. ................... | 301/124.1 |
| 2009/0033142 A1 | * | 2/2009 | Bitz et al. ...................... | 301/127 |

FOREIGN PATENT DOCUMENTS

| | | |
|---|---|---|
| DE | 3524763 A1 | 1/1986 |
| DE | 3636878 A1 | 5/1987 |
| DE | 3707162 A1 | 10/1987 |
| DE | 102008035625 A1 | 2/2009 |
| JP | 61263809 A * | 11/1986 |
| JP | 61263810 A * | 11/1986 |
| JP | 61263811 A * | 11/1986 |
| JP | 61263812 A * | 11/1986 |
| JP | 62149505 A * | 7/1987 |

* cited by examiner

*Primary Examiner* — Paul N Dickson
*Assistant Examiner* — Laura Freedman
(74) *Attorney, Agent, or Firm* — Raymond Coppiellie; Brooks Kushman P.C.

(57) ABSTRACT

The invention relates to a rear wheel suspension system for motor vehicles having a composite link axle that has two wheel-carrying longitudinal links that are each articulated pivotably on a vehicle body by one body-side pivoting bearing and a flexurally rigid, torsionally soft transverse strut that connects the longitudinal links to one another. The pivoting bearings are set at a predefined yaw angle in relation to an initial position with the pivoting bearing axes aligned with a connecting line between the centers of the pivoting bearings. The pivoting bearings are also set at a predefined roll angle relative to a horizontal plane.

6 Claims, 2 Drawing Sheets

REAR WHEEL SUSPENSION SYSTEM FOR MOTOR VEHICLES

CROSS-REFERENCE TO RELATED APPLICATIONS

This application claims priority to German patent application DE 10 2010 017 812.8, filed Jul. 8, 2010, the disclosure of which is hereby incorporated by reference in its entirety.

TECHNICAL FIELD

The invention relates to a rear wheel suspension system for motor vehicles having a composite link axle having two wheel-carrying longitudinal links that each are articulated pivotably on a vehicle body by a body-side pivoting bearing, and a flexurally rigid, torsionally soft transverse strut that connects the longitudinal links to one another. The pivoting bearings are set at a predefined yaw angle in relation to an initial position, in which the pivoting bearing axes are aligned with a connecting line between the centers of the pivoting bearings.

BACKGROUND

A rear wheel suspension system having a composite link axle, the links of which are connected to one another by a torsion rod, is known, for example, from DE 37 07 162 A1. A rear wheel suspension system of this type generally has a left-hand and a right-hand longitudinal link which are articulated with their front ends on the vehicle body by means of rubber elements, with the result that they can perform a vertical pivoting movement with regard to a roadway plane, and a torsion rod which connects the center regions of the longitudinal links to one another. The rear wheels are supported at the rear ends of the longitudinal links, with the result that vertical movements of the rear wheels relative to one another on account of roadway unevennesses are delimited by the torsional counterforce of the torsion rod.

As is known, composite link axles of this type tend to oversteer under lateral force. In order to counteract this oversteer tendency and to improve the driving behavior of the motor vehicle when driving around bends, DE 37 07 162 A1 proposes rotating the pivoting axes of the pivoting bearings by a predefined yaw angle in a horizontal plane which is parallel to the roadway plane, with the result that the pivoting axes intersect in front of the connecting line between the body-side ends of the longitudinal links. The pivoting bearings are set in this way to control the toe of the rear wheels as a function of a lateral force which acts on the rear wheels when driving around bends (toe control).

Furthermore, DE 35 24 763 A1 discloses a motor vehicle rear axle, in which the body-side pivoting bearings of wheel control elements carry the wheels are arranged and configured elastically or elastokinematically to counteract a tendency of the wheel control elements to yield in the direction of oversteer when driving around bends under the action of lateral forces that act on the wheels. In particular, the pivoting axes of the pivoting bearings are guided in each case in elastomeric elements and in a slotted guide that extends at an angle obliquely with respect to the vehicle longitudinal axis.

DE 36 36 878 A1 describes an axle suspension system for motor vehicles which consists of two longitudinal links, that are articulated pivotably on the vehicle body and carry the vehicle wheels. The ends of a flexurally rigid but torsionally soft transverse strut are connected to the two longitudinal links in an angularly rigid manner. In particular, the bearing axes of the link bearings are set obliquely to the front in such a way that their extensions intersect in the vehicle center plane and in front of the link bearings.

Finally, DE 10 2008 035 625 A1 describes a motor vehicle rear axle as composite link axle with two wheel-carrying, rigid longitudinal links, that are articulated elastically on the vehicle body, and a flexurally stiff but torsionally soft transverse strut. The pivoting axes of the pivoting bearings of the rear axle are set obliquely to the front in relation to a connecting line between the pivoting bearings.

The kinematic behavior of composite link axles is fixed by a few design parameters. The behavior is fixed, in particular, by the position of the elastomeric bearing bushes which are preferably arranged in the body-side pivoting bearings and by the shear center height of the torsion profile. The orientation of the pivoting bearing bushes plays an important role on account of the elastic properties of the bearing bushes. As a rule, the elastomeric bearing bushes are configured to be substantially softer in the axial direction than in the radial direction.

Controlling the roll steer of the composite link axle during rolling, wheel camber change during rolling and the roll center height are the most important parameters for rear wheel suspension systems. These parameters cannot be set independently of one another. With the given design parameters, a partially undesired elevation of the roll center results from an increase in the roll control and an increase in the wheel camber change during rolling.

SUMMARY

According to one aspect of this disclosure, a rear wheel suspension system is provided that has a composite link axle. The composite link axle affords satisfactory toe behavior by way of its elastokinematic behavior and additionally presents the option of increasing the roll control, while at the same time the roll center is lowered and, moreover, the wheel camber change during rolling is positively influenced.

According to one aspect of the disclosure, the rear wheel suspension system comprises a composite link axle which has body-side pivoting bearings that are set at a predefined yaw angle in relation to an initial position. The pivoting bearing axes are aligned with a connecting line between the centers of the body-side pivoting bearings and are set at a predefined roll angle.

A yaw angle is set by rotating the pivoting bearings about a yaw axis (vertical axis) that extends through the center of the respective pivoting bearings and parallel to a vehicle yaw axis (vehicle vertical axis). After rotation, the pivoting bearing axes are inclined with respect to the connecting line between the centers of the pivoting bearings. A roll angle is set by rotating the pivoting bearings about a roll axis (longitudinal axis) that extends through the center of the respective pivoting bearings and parallel to a vehicle roll axis (vehicle longitudinal axis). After rotation, the pivoting bearing axes are inclined with respect to a horizontal plane that extends through the centers of the pivoting bearings and parallel to the roadway plane. The center of a pivoting bearing is understood to be a point that, with regard to the width, lies in the center of the pivoting bearing and on the pivoting bearing axis of the associated pivoting bearing.

Surprisingly, it has been shown in a comparison between composite link axles according to the invention and link axles that have the pivoting bearings set merely at a yaw angle, that the additional setting of the pivoting bearings at a roll angle substantially influences the elastokinematic behavior of the composite link axle and presents the option of increasing the roll control. The composite link axle lowers the roll center and, moreover, the wheel camber change is positively influenced during rolling.

The pivoting bearings have a three-dimensional (spherical) setting with respect to the abovementioned initial position after the rotation about the yaw axis and the rotation about the roll axis. Rotation about the yaw axis brings about a planar setting of the pivoting bearings with respect to the initial position. The penetration point of the pivoting bearing axes through the vehicle longitudinal center plane preferably lies in front of the connecting line between the centers of the pivoting bearings and horizontal plane which extends parallel to the roadway plane. As a result, the roll control of the composite link axle is increased with satisfactory toe control, and at the same time the roll center is lowered. Moreover, the wheel camber change is positively influenced during rolling.

The setting of the pivoting bearings is not restricted to a defined roll or yaw angle. Preferably, the roll angle is selected from a range from approximately 5° to approximately 25°, preferably from 5° to 15°, more preferably 6°, and the yaw angle is selected from a range from approximately 5° to approximately 45°. The selection of the roll angle depends on the service life of the bush and the mounting conditions.

The pivoting bearings are preferably configured as elastomeric bearings, for example by rubber elements or elastomeric bearing bushes that are inserted in each pivoting bearing. The construction of the rubber elements is known in principle. The elastomeric bearings are advantageously configured to be softer and more compliant in the axial direction than in the radial direction. This makes possible a defined axial displacement of the bearings as a function of longitudinal, transverse and/or rolling forces which occur in the respective driving state. The rigidity ratio between the axial and radial rigidity is advantageously approximately 1:10. That is to say, the elastomeric bearing bushes have a rigidity which is 10 times higher in the radial direction than in the axial direction. Axial displacement is defined to configure the elastokinematic behavior of the rear wheel suspension system in a targeted manner. The rolling behavior and the toe behavior can be varied within a wide range by the selection of the setting of the longitudinal links in the roll angle and yaw angle and by the elastic properties of the elastomeric bearings. The respective setting magnitude (roll angle left/right) may be identical, but it is also possible for different setting magnitudes to be selected.

The above advantages are achieved by a rear wheel suspension system having the features of patent claim 1. Further, particularly advantageous refinements of the invention are disclosed by the subclaims. It is to be noted that the features that are described individually in the patent claims can be combined with one another in any desired, technically appropriate way and indicate further refinements of the invention. The description additionally characterizes and specifies the invention with reference to the figures.

BRIEF DESCRIPTION OF THE DRAWINGS

Further advantageous details and effects of the invention are explained in greater detail in the following text using an exemplary embodiment which is not to be considered restrictive and is illustrated in the drawing, in which, diagrammatically.

Figure 1:
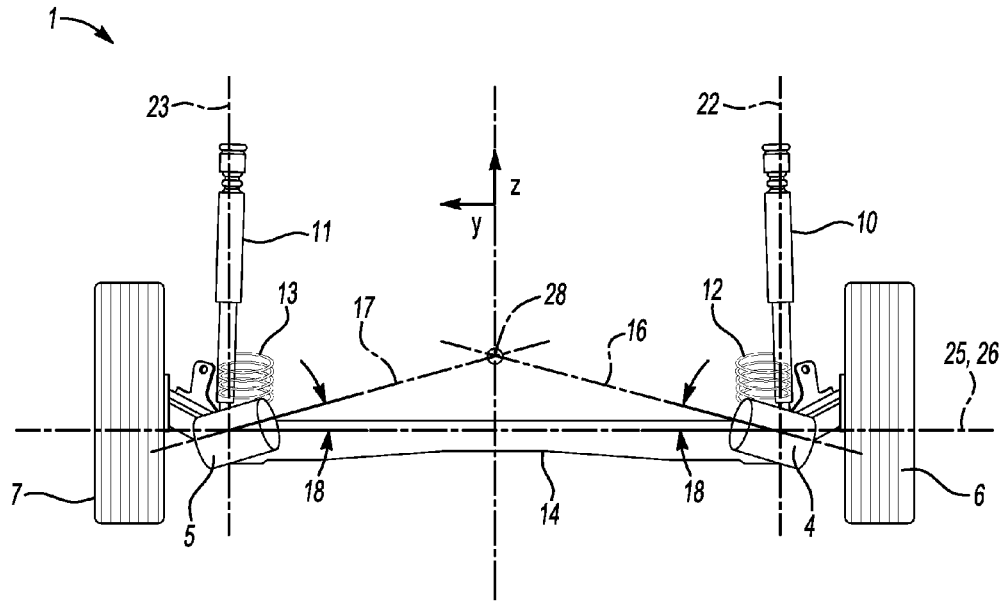
FIG. 1 shows a front view of an embodiment of the rear wheel suspension system according to the invention.

Further advantageous details and effects of the invention are explained in greater detail in the following text using an exemplary embodiment which is not to be considered restrictive and is illustrated in the drawing, in which, diagrammatically:

In the different figures, identical parts are always provided with the same designations, with the result that they are also as a rule described only once.

DETAILED DESCRIPTION

Figure 2:
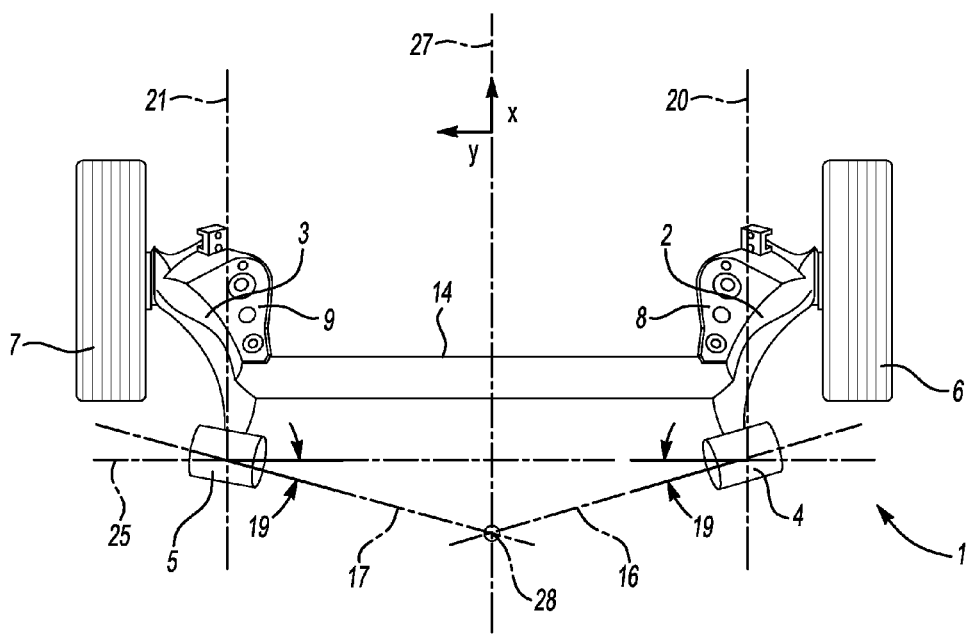
FIG. 2 shows a plan view of the rear wheel suspension system according to the invention of FIG. 1.
Figure 3:
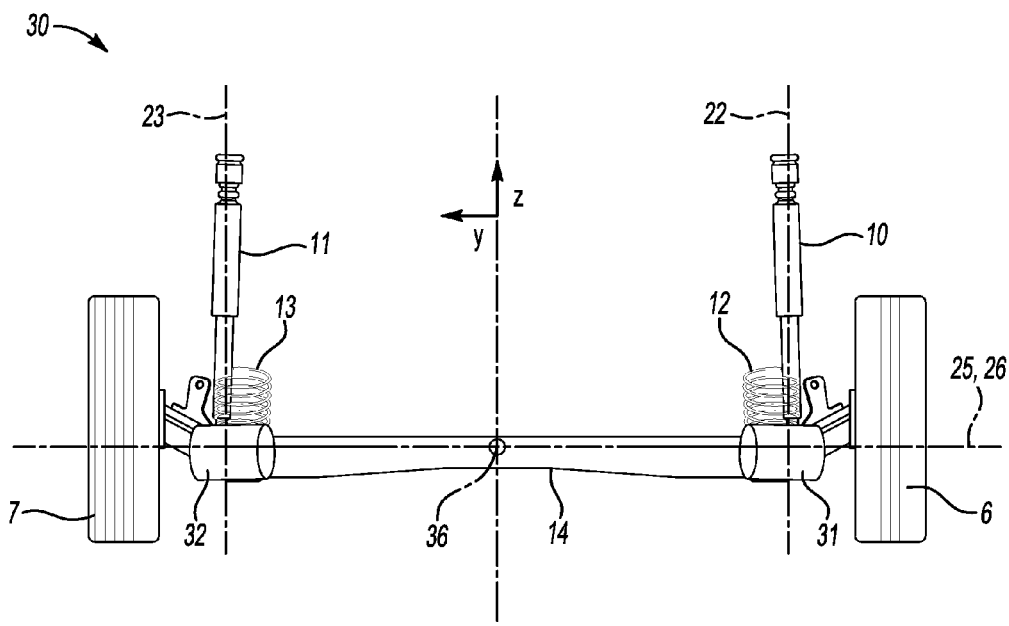
FIG. 3 shows a front view of a rear wheel suspension system according to the prior art.
Figure 4:
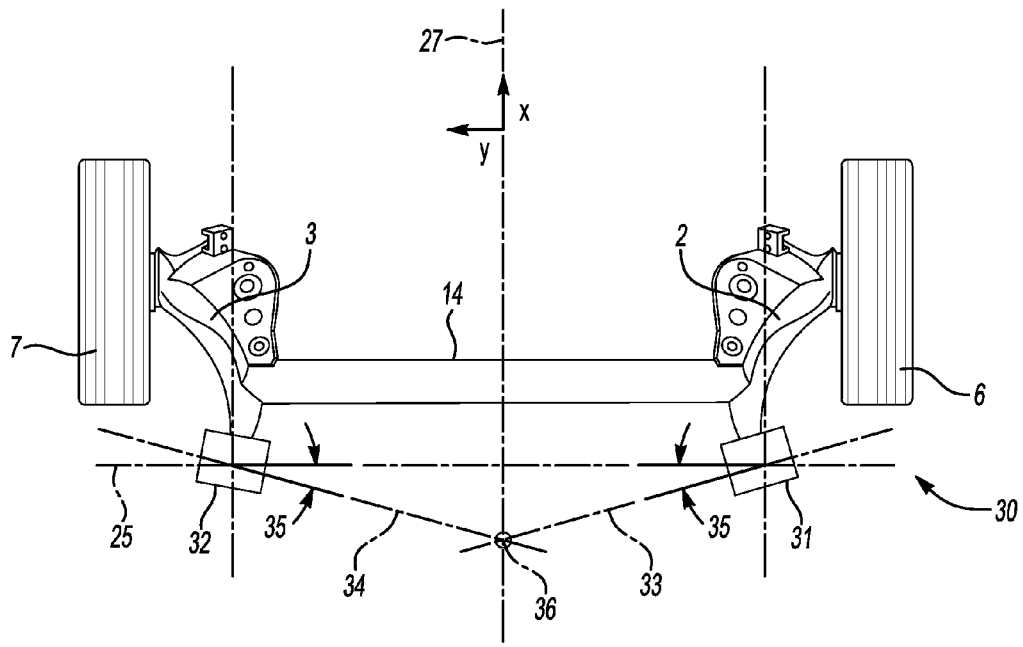
FIG. 4 shows a plan view of the rear wheel suspension system according to the prior art of FIG. 3.

A coordinate system is illustrated in each case in FIGS. 1 to 4. In FIGS. 1 to 3, the Z axis is oriented to the upper figure edge, and in reality is oriented to the top. In this context, reality means the natural perception of the driver. The Y-axis is oriented to the left-hand figure edge, but in reality is oriented to the right, that is to say to the right-hand vehicle side. In FIGS. 2 and 4, the X axis is oriented to the upper figure edge, and is oriented to the rear in reality. The Y axis is oriented to the left-hand figure edge, but is oriented to the right in reality, that is to say to the right-hand vehicle side. In the following text, the realistic side designation is chosen for the side designations in a deviation from the respective drawing plane.

FIG. 1 and FIG. 2 show a preferred embodiment of the rear wheel suspension system according to the invention having a composite link axle 1, FIG. 1 representing a front view and FIG. 2 representing a plan view of the latter. The composite link axle 1 comprises a left-hand longitudinal link 2 (not on the left in the drawing plane) and a right-hand longitudinal link 3 (not on the right in the drawing plane), as can be seen in the plan view in FIG. 2. Furthermore, each longitudinal link 2, 3 has, at its body-side ends that are directed to the front in the vehicle longitudinal direction, a left-hand body-side pivoting bearing 4 (not on the left in the drawing plane) and a right-hand body-side pivoting bearing 5 (not on the right in the drawing plane).

The composite link axle 1 is articulated pivotably via the pivoting bearings 4, 5 on an auxiliary frame or vehicle body (not shown). The longitudinal links 2, 3 carry a left-hand wheel 6 (not on the left in the drawing plane) and a right-hand wheel 7 (not on the right in the drawing plane) at their ends that face away from the body-side pivoting bearings 4, 5. The wheels 6, 7 are mounted rotatably on the longitudinal links 2, 3 by bearing elements (not shown). The longitudinal links 2, 3 are connected to a flexurally rigid, preferably torsionally soft transverse strut 14 in a front region of the longitudinal links 2, 3 but spaced apart somewhat to the rear from the body-side pivoting bearings 4, 5 in the drawing plane.

In each case a left-hand reinforcing element 8 and a right-hand reinforcing element 9 extend between the ends of the transverse strut 14 that are connected to the longitudinal links 2, 3 and the wheel-side ends of the longitudinal links 2, 3. The reinforcing elements 8, 9 are each connected to a narrow side of the respective longitudinal link 2, 3 and in a region along the end sections of the transverse strut 14 to the latter, preferably in a material to material manner, such as by welding. The reinforcing elements 8, 9 are configured to each to receive and support a damping element 10, 11, for example a shock absorber, and a spring element 12, 13, for example a coil spring. The reinforcing elements 8, 9 are arranged between the longitudinal links 2, 3 and the transverse strut 14 to reinforce the longitudinal links 2, 3 with respect to lateral forces that act on the wheels 6, 7. The reinforcing elements also hold the longitudinal links 2, 3 in an angularly rigid manner with respect to the transverse strut 14.

As can be seen in FIG. 1, the pivoting bearings 4, 5 are each set at a roll angle 18 with respect to the horizontal plane 26 that extends through the centers of the pivoting bearings 4, 5 and parallel to the roadway plane. The left-hand pivoting bearing 4 is rotated by the roll angle 18 about a left-hand roll axis 20 (longitudinal axis) that is assigned to the left-hand pivoting bearing 4, as shown in FIG. 2, and extends through the center of the left-hand pivoting bearing 4 and parallel to the vehicle longitudinal axis. Referring to FIG. 1, the rotation of the left-hand pivoting bearing 4 by the roll angle 18 is in the clockwise direction. The right-hand pivoting bearing 5 is rotated by the roll angle 18 about a right-hand roll axis 21 (longitudinal axis) that is assigned to the right-hand pivoting bearing 5, as shown in FIG. 2 and extends through the center of the right-hand pivoting bearing 5 and parallel to the vehicle longitudinal axis. Referring to FIG. 1, the rotation of the right-hand pivoting bearing 5 by the roll angle 18 takes place in the counterclockwise direction.

After the rotation of the pivoting bearings 4, 5 by the roll angle 18, the corresponding pivoting bearing axes 16, 17 are inclined by the roll angle 18 with respect to the horizontal plane 26 that extends through the centers of the pivoting bearings 4, 5 and parallel to the roadway plane. As shown in FIG. 2, the end sides of the pivoting bearings 4, 5 are oriented to the vehicle longitudinal center plane 27. The pivoting bearing axes 16, 17 of the pivoting bearings 4, 5 are set at the roll angle 18 to intersect, as shown in FIG. 1, at an intersection point 28 that lies in the vehicle longitudinal center plane 27. The intersection point 28 of the pivoting bearing axes 16, 17 is equal to the penetration point 28 of the pivoting bearing axes 16, 17 through the vehicle longitudinal center plane 27. The intersection point 28 lies above the horizontal plane 26 or above the connecting line 25. The connecting point 25 and the horizontal plane 26 coincide as illustrated in FIG. 1.

Referring to FIG. 2, the pivoting bearings 4, 5 are each at a yaw angle 19 with respect to the connecting line 25 that extends through the centers of the pivoting bearings 4, 5 and perpendicular relative to the vehicle longitudinal center plane 27. The left-hand pivoting bearing 4 is rotated by the yaw angle 19 about a left-hand yaw axis 22 (vertical axis) that is assigned to the left-hand pivoting bearing 4, as shown in FIG. 1 and extends through the center of the left-hand pivoting bearing 4 and parallel to the vehicle vertical axis. As shown in FIG. 2, rotation of the left-hand pivoting bearing 4 by the yaw angle 19 takes place in the counterclockwise direction. The right-hand pivoting bearing 5 is rotated by the yaw angle 19 about a right-hand yaw axis 23 (vertical axis) that is assigned to the right-hand pivoting bearing 5, as shown in FIG. 1, and extends through the center of the right-hand pivoting bearing 5 and parallel to the vehicle vertical axis. Referring to FIG. 2, rotation of the right-hand pivoting bearing 5 by the yaw angle 19 is in the clockwise direction.

After the rotation of the pivoting bearings 4, 5 by the yaw angle 19, the corresponding pivoting bearing axes 16, 17 are inclined by the yaw angle 19 with respect to the connecting line 25 that extends through the centers of the pivoting bearings 4, 5 and perpendicular relative to the vehicle longitudinal center plane 27. The pivoting bearing axes 16, 17 of the pivoting bearings 4, 5 are set at the yaw angle 19 to intersect, as shown in FIG. 2, at an intersection point 28 that lies in the vehicle longitudinal center axis 27. The intersection point 28 of the pivoting bearing axes 16, 17 is identical to the penetration point 28 of the pivoting bearing axes 16, 17 through the vehicle longitudinal center plane 27. The intersection point 28 lies in front of the connecting line 25.

In the preferred exemplary embodiment shown in FIGS. 1 and 2, the pivoting bearings 4, 5 are set at a roll angle of approximately 6° (the figures are of course not to scale) relative to the horizontal plane 26 and a yaw angle of approximately 27° relative to the connecting line 25 between the centers of the pivoting bearings 4, 5. Surprisingly, with this embodiment of the rear wheel suspension system the roll center height can be lowered by 6 mm and the roll control could be increased by 0.5°/m compared to a rear wheel suspension system having a composite link axle having pivoting bearings set merely at a yaw angle, that is to say in a planar manner. At the same time, the wheel camber change may be positively influenced.

In order to clarify the difference of the three-dimensional or spherical setting of the pivoting bearings 4, 5 according to the invention from a rear wheel suspension system having a composite link axle, in which the pivoting bearings are set merely at the yaw angle, in a planar manner, FIGS. 3 and 4 represent a rear wheel suspension system having a composite link axle 30 made according to the prior art. In particular, FIG. 3 shows a front view of said rear wheel suspension system, while FIG. 4 shows a plan view of the same rear wheel suspension system.

In FIGS. 3 and 4, parts which are identical or functionally identical to the parts which are shown in FIGS. 1 and 2 of the rear wheel suspension system according to the invention are provided with the same designations. A renewed description of said parts will be dispensed with in the following text. Reference is made merely to the differences between the rear wheel suspension system according to the invention and the rear wheel suspension system according to the prior art.

As illustrated in FIG. 3, the left-hand pivoting bearing 31 and the right-hand pivoting bearing 32 have no inclination with respect to the horizontal plane 26 or connecting line 25 that coincide in this view, in contrast to the embodiment of the invention in FIG. 1. The pivoting bearing axes 33, 34 shown in FIG. 4 of the pivoting bearings 31, 32 are aligned in each case with the connecting line 25 or extend in the horizontal plane 26, as shown in FIG. 3. Accordingly, the pivoting bearing axes 33, 34 intersect at an intersection point 36 that lies both in the vehicle longitudinal center plane 27 and in the horizontal plane 26. In the exemplary embodiment shown in FIG. 1, the intersection point 28 lies above the horizontal plane 26.

As shown in FIG. 4, the pivoting bearings 31, 32 are set at a yaw angle 35 with respect to the connecting line 25 that extends through the centers of the pivoting bearings 31, 32 and perpendicularly with respect to the vehicle longitudinal center plane 27. The left-hand pivoting bearing 31 is rotated by the yaw angle 35 merely about a left-hand yaw axis 22 (vertical axis) that is assigned to said left-hand pivoting bearing 31, as shown in FIG. 3 and extends through the center of the left-hand pivoting bearing 31 and parallel to the vehicle vertical axis. The right-hand pivoting bearing 32 is rotated by the yaw angle 35 about a right-hand yaw axis 23 (vertical axis) that is assigned to the right-hand pivoting bearing 32, as shown in FIG. 3, and extends through the center of the right-hand pivoting bearing 32 and parallel to the vehicle vertical axis.

The pivoting bearing axes 33, 34 of the pivoting bearings 31, 32 which are set at the yaw angle 35 in this way intersect, as shown in FIG. 4, at an intersection point 36 that lies in the vehicle longitudinal center plane 27. As illustrated in FIG. 4, the intersection point 36 lies in front of the connecting line 25.

According to the prior art, substantially only the toe behavior of the composite link axle 30 is influenced or controlled by only setting of the pivoting bearings 31, 32 by the yaw angle 35. An increase in the roll control and/or lowering of the roll center height as proposed cannot be achieved with the composite link axle 30 according to the prior art.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A rear wheel suspension system for motor vehicles having a composite link axle, body-side pivoting bearings that are set at a predefined yaw angle in relation to an initial position, with pivoting bearing axes aligned with a connecting line between the centers of the pivoting bearings,
   wherein the pivoting bearings are set at a predefined roll angle in relation to a horizontal plane, and wherein the pivoting bearings are set with pivoting bearing axes penetrating a vehicle longitudinal center plane in front of the connecting line between the centers of the pivoting bearings and above the horizontal plane that extends through the centers of the pivoting bearings.

2. The rear wheel suspension system as claimed in claim 1, wherein the pivoting bearings are set at a roll angle from a range from approximately 5° to approximately 25° and at a yaw angle from a range from approximately 5° to approximately 45°.

3. The rear wheel suspension system as claimed in claim 1, wherein the pivoting bearings are set at a roll angle of 6°.

4. The rear wheel suspension system as claimed in claim 1, wherein the pivoting bearings are configured as elastomeric bearings.

5. The rear wheel suspension system as claimed in claim 4, wherein the elastomeric bearings are configured to be softer in the axial direction than in the radial direction.

6. A rear wheel suspension system for motor vehicles comprising:
   a composite link axle; and
   body-side pivoting bearings are set at a predefined yaw angle in relation to an initial position, wherein:
      the pivoting bearings have pivoting bearing axes aligned with a connecting line between the centers of the pivoting bearings,
      the pivoting bearings are set at a predefined roll angle in relation to a horizontal plane, and
      the pivoting bearings are set with pivoting bearing axes extending through a vehicle longitudinal center plane in front of the connecting line between the centers of the pivoting bearings and above the horizontal plane that contains the centers of the pivoting bearings.

* * * * *